W. E. TRUMPLER.
CONSTANT VOLUME REGULATOR FOR TURBOCOMPRESSORS.
APPLICATION FILED FEB. 19, 1921.
1,408,660. Patented Mar. 7, 1922.
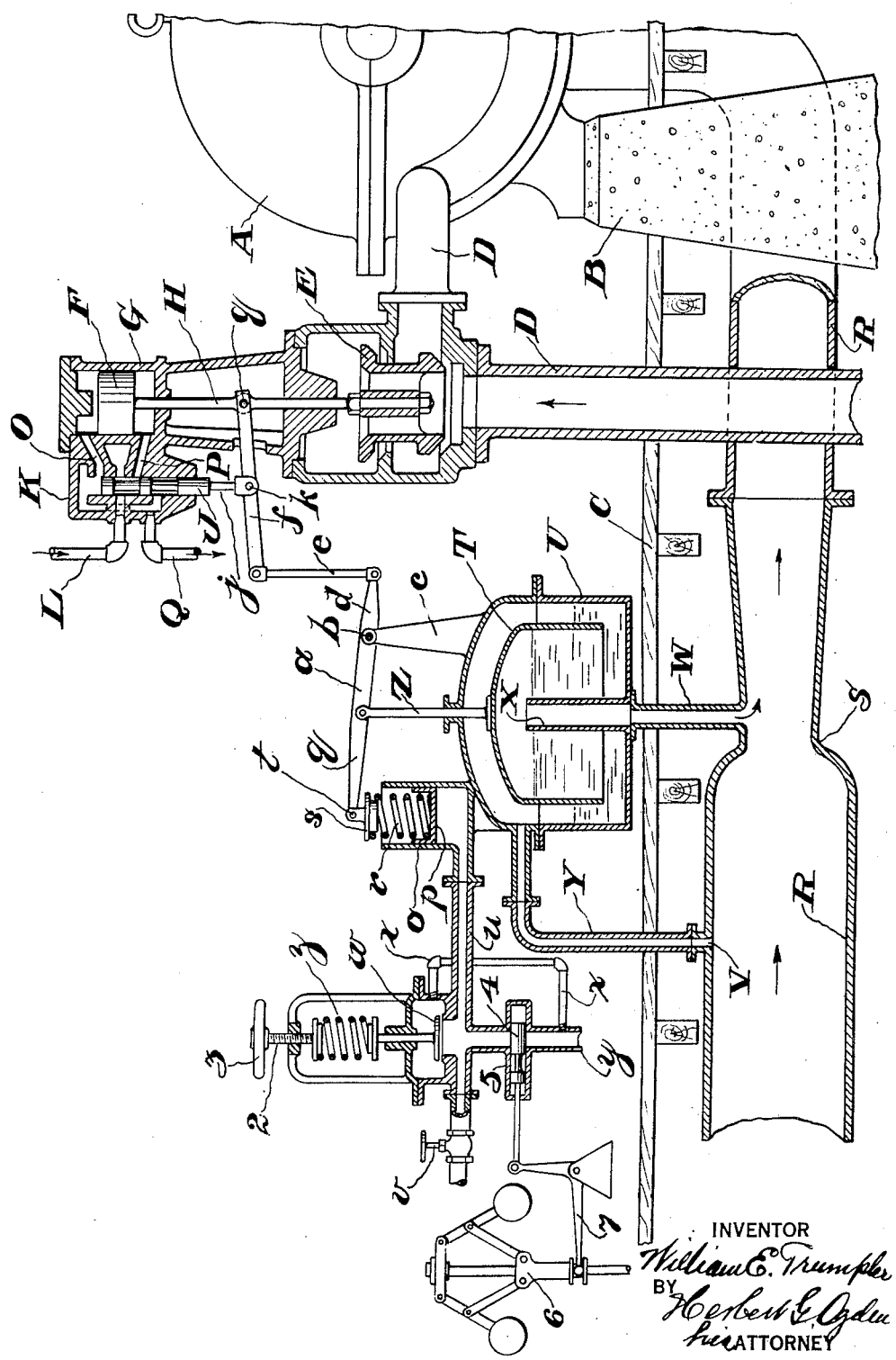
INVENTOR
William E. Trumpler
BY Herbert E. Ogden
his ATTORNEY

UNITED STATES PATENT OFFICE.

WILLIAM E. TRUMPLER, OF PHILLIPSBURG, NEW JERSEY, ASSIGNOR TO INGERSOLL-RAND COMPANY, OF JERSEY CITY, NEW JERSEY, A CORPORATION OF NEW JERSEY.

CONSTANT-VOLUME REGULATOR FOR TURBOCOMPRESSORS.

1,408,660.     Specification of Letters Patent.     Patented Mar. 7, 1922.

Application filed February 19, 1921. Serial No. 446,461.

*To all whom it may concern:*

Be it known that I, WILLIAM E. TRUMPLER, a citizen of Switzerland, a resident of Phillipsburg, Warren County, and State of New Jersey, have invented a certain Constant-Volume Regulator for Turbocompressors, of which the following is a specification accompanied by drawings.

This invention relates to a constant volume regulator for a turbo compressor, turbo blower or the like, by means of which the speed of the machine is so regulated that the volume of delivery is maintained substantially constant, irrespective of the pressure required to overcome the resistance in the discharge line system.

In a regulator of this type, a movable member, which may conveniently be in the form of a bell shaped float, is subjected to pressure differences on the inside and outside, from suitable sources, at least one of which should be a variable source connected with the system to be regulated, and fluctuations in such pressure differences cause the float to rise and fall and affords means adapted to be connected through suitable balancing and differential levers or the like, to the throttle valve of the motor of the compressor, for varying the amount of fluid supplied to the motor.

The objects of the present invention are to insure steady and even operation of the regulator, avoid oscillations in the parts of the regulator, prevent over-speeding of the turbo-compressor, simplify the construction and reduce the number of operative parts between the regulator and throttle valve mechanism of the motor of the compressor.

Further objects of the invention will hereinafter appear and to all of these ends the invention consists of the features of construction, arrangement of parts and combinations of elements substantially as hereinafter fully described and claimed in this specification and shown in the accompanying drawing, which is a diagrammatic longitudinal sectional elevation of a portion of a turbocompressor provided with a volume regulator constructed in accordance with one preferred form of my invention.

Referring to the drawing, a turbo compressor A is shown partly broken away for convenience of illustration and mounted on the foundations B. For illustrative purposes the floor line C of a power house is indicated, and it is to be understood that the steam end of the turbo compressor A is being viewed in the drawing. The discharge from the compressor (not shown) may be led to a blast furnace, for instance, to which it is desired to furnish a constant volume of air against varying pressures and for this purpose a constant volume regulator is provided for the motor of the compressor.

Steam is supplied to the compressor motor through the inlet pipe D controlled by the suitable throttle valve E actuated by the piston F in the cylinder G and connected to the throttle valve E by means of the stem H. Any other suitable form of valve actuating mechanism may be provided and in the present instance, a pilot valve J operating in the valve casing K controls the flow of oil or other suitable fluid from the supply pipe L through passages O and P above and below the piston F, the oil being discharged through the discharge pipe Q.

The intake conduit R for the compressor is shown conveniently arranged below the floor line C and for the purpose of this invention, is provided with a Venturi tube or restricted portion S at which point the velocity of the incoming fluid is increased. Since the static pressure of the fluid at the throat or restricted portion S of the Venturi tube is sub-atmospheric and less than that at the full diametered portion of the venturi, advantage is taken of this fact in the construction of a suitable volume regulator operatively connected to actuate the pilot valve J and thus control the operation of the throttle valve E of the compressor motor. Movable means, preferably in the form of a bell shaped float T within the receptacle U is provided for controlling the power delivered to the motor and this float is preferably actuated by the difference in pressure existing between the restricted portion S of the intake conduit R at which the velocity of the fluid is increased, and a source of higher pressure, which may be the pressure in the full diametered portion of the intake conduit at the point V. As shown, the restricted portion S of the venturi is connected by the pipe W and tube X to the inside of the bell while the outside of the bell is connected by the piping Y to the point V in the full diametered portion of the intake conduit, although the space outside of the bell T might be open to atmosphere under some circumstances, if desired. Fluctuations in pressure differences on the two sides of the float T cause the float to move up and down to vary the amount of fluid supplied to the motor of the compressor.

As shown, the float is connected by a stem Z to the balancing lever $a$ pivoted at $b$ on the bracket $c$. The shorter arm $d$ of the balancing lever $a$ is connected by the link $e$ to a lever $f$ at one end, the other end of said lever $f$ being pivoted at $g$ to the stem $h$ of the throttle valve E, and the stem $j$ of the pilot valve J is pivoted at $k$ on the lever $f$.

In the operation of the device so far described, let it be assumed that the compressor is connected to supply a blast furnace with a constant volume of air. In such case, the resistance in the furnace to the passage of air varies, and if the resistance increases, the speed of the compressor must increase, in order to supply the same quantity of air passing through the compressor. If the resistance decreases, the speed must be reduced, to maintain a constant quantity of air and prevent too much air from passing.

Upon an increase of resistance in the discharge of the compressor, the velocity head in the intake is lowered which results in an increase of pressure in the bell T which forces the bell upwardly, pulling the pilot valve J downwardly to the position indicated in the drawing, thus admitting oil under pressure through the passage P in the valve casing K beneath the steam inlet piston valve F, which moves upwardly and opens the steam inlet throttle valve E to a further extent, increasing the speed of the motor. Upon a decrease of resistance in the discharge of the compressor, the velocity head in the intake R is increased with a resultant decrease of pressure in the bell. The bell T is sucked or pulled downwardly and the pilot valve J is forced upwardly, admitting pressure above the piston inlet valve F, forcing the throttle valve E downwardly, thus tending to close the throttle valve to a greater extent which decreases the speed of the engine. This regulation and control effected by the volume regulator continues automatically.

The pressure difference between the inside and the outside of the bell T produces a thrust which is transmitted by the rod or stem Z to the balancing lever $a$. The moment produced by this thrust is automatically compensated by a weight, a suitable spring, dash-pot, or other device or similar connection, but in the present instance and in accordance with my invention, this thrust is compensated by the pressure in a compensating fluid pressure cylinder $o$ having a piston $p$ suitably connected to the longer arm $q$ of the balancing lever $a$. The piston $p$ may be connected to the balancing lever either by a rigid or elastic member, but for the reasons hereinafter to appear, I prefer a resilient or elastic connection effected by means of the coiled spring $r$ suitably secured to the piston $p$ at one end and to a cap or guide $s$ at the other end, pivoted at $t$ to the end of the balancing lever $o$.

The compensating cylinder $o$ is provided with an inlet pipe $u$ controlled by the valve $v$ and oil or other fluid is supplied through the restricted opening afforded by the valve $v$ which limits the flow. Means are provided for maintaining the pressure in the compensating cylinder $o$ substantially constant. In this instance, the pressure is controlled by the relief valve $w$ which permits oil to pass from the pipe $u$ through the by-pass $x$ to the discharge pipe $y$. The tension of a spring $z$ bearing on the stem of the relief valve $w$ may be adjusted by means of the screw 2 and hand wheel 3, so that the relief valve $w$ may be set for any given pressure. By this means the pressure in the compensating cylinder $o$ is maintained substantially constant for any position of the piston $p$, and the regulator maintains a constant volume of flow in the compressor for any pressure in the discharge pipe. The piston $p$ in the compensating cylinder $o$ can only follow a slow change of the load, and to make the regulator more responsive to quick changes in load, the coiled spring or other elastic member is provided connecting the piston $p$ to the balancing lever $a$. Upon a change of load, the expansion or compression of the spring $r$ will follow immediately with a slight variation of the volume of air passed, until the piston $p$ has followed in the cylinder $o$ and compressed or extended the spring $r$ to its original tension. The function of the constant pressure cylinder and its piston with the spring connection to the balancing lever $a$ is to prevent oscillations of the parts of the regulator and serves to maintain a constant thrust.

To prevent the regulator from causing overspeeding of the machine, suitable automatic means are provided, in this instance shown in the form of a speed limit valve 4 in the casing 5 connected to the supply pipe $u$ of the cylinder $o$ between the said pipe and the discharge $y$. This speed limit valve is connected to be operated by a suitable ball or spring governor 6 through the agency of the bell crank lever 7 or other suitable means. It is to be understood that the governor 6 is adapted to be mounted on the machine, but is shown diagrammatically in the drawing. When the maximum speed is reached, the governor opens the speed limit valve 4 and produces an additional drain to the compensating cylinder $o$ which lowers the fluid pressure to a minimum, so that irrespective of the adjustment of the regulator by means of the relief valve $u$, the steam inlet valve E for the motor will be further closed and the speed of the machine reduced. When the speed of the machine returns to normal, the speed limit valve 4 is again closed by the action of the governor, and the volume regulator is again in full control of the machine. Since the speed limit valve 4 prevents over-speeding of the machine, devices such as a differential lever for introducing the speed limit regulation are unnecessary and the balancing lever *a* of the volume regulator can be directly connected to the steam inlet valve E, if desired, or as shown in the drawing, to the pilot lever *f* of the steam admission relay or pilot valve J. Although I have shown the speed limit valve 4 as of the translatory type, any suitable type of valve may be provided, and furthermore, the location of the pressure relief valve *w* and the speed limit valve 4 need not be in the immediate neighborhood of the compensating cylinder *o* as shown, although it is preferable to make the distances between these parts as short as conveniently possible, and the movable part of the speed limit valve could be the governor sleeve itself. Although oil has been mentioned as the fluid used for the operation of the regulator, this is because oil is generally used, but any other fluid may be provided, by means of which the same results are accomplished.

I claim:

1. A constant volume regulator for a motor driven turbo compressor comprising an intake conduit for the compressor, movable means for controlling the power delivered to the motor and actuated by the difference in pressure existing between two points in the intake of the compressor due to the velocity of the fluid passed through the intake, and a constant fluid pressure compensating device connected to said movable regulating means for resisting the thrust of said movable means.

2. A constant volume regulator for a motor driven turbo compressor comprising an intake conduit for the compressor, movable means for controlling the power delivered to the motor and actuated by the difference in pressure existing between a point in the intake at which the velocity of the fluid is increased, and a source of higher pressure and a constant fluid pressure compensating device elastically connected to said movable means for resisting the thrust of the said movable means.

3. A constant volume regulator for a motor driven turbo compressor comprising an intake conduit for the compressor, a receptacle, a bell shaped float in said receptacle, one side of said float being subjected to fluid pressure at a point in the intake at which the velocity of the fluid is increased whereby fluctuations in pressure difference on the two sides of the float cause the float to move up and down to vary the amount of fluid supplied to the motor of the compressor, and a constant fluid pressure compensating device having a movable portion elastically connected to said bell shaped float for resisting the thrust of said float.

4. A constant volume regulator for a motor driven turbo compressor comprising an intake conduit for the compressor, movable means including a balancing lever connected to control the power delivered to the motor and actuated by the difference in pressure existing between two points in the intake of the compressor due to the velocity of the fluid passed through the intake, a compensating fluid pressure cylinder and piston for resisting the thrust of the balancing lever, said piston being elastically connected to said balancing lever, and means for maintaining substantially constant pressure in said compensating cylinder.

5. A constant volume regulator for a motor driven turbo compressor comprising an intake conduit for the compressor, movable means for controlling the power delivered to the motor and actuated by the difference in pressure existing between two points in the intake of the compressor due to the velocity of the fluid passed through the intake, a compensating fluid pressure cylinder and piston for resisting the thrust of said movable regulating means, said piston being connected to the movable means and means for maintaining substantially constant pressure in said compensating cylinder.

6. A constant volume regulator for a motor driven turbo compressor comprising an intake conduit for the compressor, movable means for controlling the power delivered to the motor and actuated by the difference in pressure existing between two points in the intake of the compressor due to the velocity of the fluid passed through the intake, and a constant fluid pressure compensating device connected to said movable regulating means for resisting the thrust of said movable means, a by-pass and a speed limit valve in the fluid pressure supply line for the compensating device, and a speed governor for automatically controlling said speed limit valve.

7. A constant volume regulator for a motor driven turbo compressor comprising an intake conduit for the compressor, movable means for controlling the power delivered to the motor and actuated by the difference in pressure existing between a point in the intake at which the velocity of the fluid is increased, and a source of higher pressure, and a constant fluid pressure compensating device elastically connected to said movable means for resisting the thrust of the said movable means, a by-pass and a speed limit valve in the fluid pressure supply line for the compensating device, and a speed governor for automatically controlling said speed limit valve.

8. A constant volume regulator for a motor driven turbo compressor comprising an intake conduit for the compressor, a receptacle, a bell shaped float in said receptacle, one side of said float being subjected to fluid pressure at a point in the intake at which the velocity of the fluid is increased whereby fluctuations in pressure difference on the two sides of the float cause the float to move up and down to vary the amount of fluid supplied to the motor of the compressor, and a constant fluid pressure compensating device having a movable portion elastically connected to said bell shaped float for resisting the thrust of said float, a by-pass and a speed limit valve in the fluid pressure supply line for the compensating device, and a speed governor for automatically controlling said speed limit valve.

In testimony whereof I have signed this specification.

WILLIAM E. TRUMPLER.